INVENTORS
Robert M. Tuck &
Mark E. Fisher

Charles R. White
ATTORNEY

March 18, 1969 R. M. TUCK ET AL 3,433,096
TORQUE CONVERTER TRANSMISSION
Filed Nov. 14, 1966

INVENTORS
Robert M. Tuck &
Mark E. Fisher

Charles L. White
ATTORNEY

United States Patent Office 3,433,096
Patented Mar. 18, 1969

3,433,096
TORQUE CONVERTER TRANSMISSION
Robert M. Tuck, Indianapolis, and Mark E. Fisher,
Carmel, Ind., assignors to General Motors Corporation, Detroit, Mich., a corporation of Delaware
Filed Nov. 14, 1966, Ser. No. 593,912
U.S. Cl. 74—731                                25 Claims
Int. Cl. F16h 47/06

ABSTRACT OF THE DISCLOSURE

Dual turbine torque converter transmission and controls for vehicles in which the torques of both turbines are combined and transmitted to a drive shaft until mid-range speed ratio, at this speed ratio the first turbine can be released from the drive by disengagement of a clutching device so that the converter performance and efficiency will be improved. If desired the clutching device can remain engaged so that the negative torque developed by the first turbine after the mid-range speed ratio combines with positive second turbine torque to reduce drive shaft speed. This reduces vehicle speed-up when the transmission is unloaded.

---

This invention relates to power transmissions and more particularly to a multi-turbine torque converter transmission having a large ratio coverage which provides a high stall ratio and high speed efficiency and including selectively-actuated structure for reducing torque converter output speeds and minimizing vehicle speed-up upon load release.

Prior to this invention dual range torque converter transmissions similar to that of this invention have been utilized in vehicles such as loaders and dozers to increase ratio coverage and provide high stall ratio and also high speed efficiency. However, when such vehicles are working and the load is reduced or released, there has been a resultant sudden speed-up of the vehicle which detracts from vehicle control and efficiency.

This invention concerns a multi-turbine torque converter transmission in which, at stall, substantially all the torque is delivered by a first turbine to a torque combining element. As vehicle speed increases, the torque is gradually and smoothly transferred to a second turbine which has a lower torque ratio. At a mid-speed ratio, the first turbine is released so that in high speed ranges converter performance is equal to that of a conventional converter. This converter operation is particularly beneficial in normal travel operations since there is smooth automatic ratio upshift and downshift. In this invention advantageous use is made of negative first turbine torques after the mid-speed range by selectively maintaining the first turbine in the drive line to reduce transmission output speeds. When unloaded, the increase in vehicle speed is minimized since the transmission output speed is maintained at low speed, thus allowing the vehicle operator to more effectively and efficiently handle the vehicle when working.

An object of this invention is to provide a multi-turbine torque converter transmission in which the torques of the turbines are selectively combined to provide for increased ratio coverage and in which there is advantageous use of negative first turbine torques to reduce transmission output speeds thereby reducing vehicle speed-ups when the vehicle is relieved of a load.

Another object of this invention is to provide a multi-turbine torque converter transmission in which there is a combining of turbine torques to provide for a high stall torque ratio, an automatic release of the torque on one of the turbines at a predetermined output ratio to provide for greater ratio coverage and selectively engageable means to tie in first turbine torque throughout the entire torque converter operating range.

Another object of this invention is to provide a governor-controlled clutch between a torque converter turbine and a turbine driven transmission member to automatically couple or uncouple the turbine and the driven member at predetermined torque converter output speeds.

Another object of this invention is to provide a dual range torque converter transmission including a one-way device for normal operation of the converter to extend torque converter ratio coverage and an additional manually contolled friction device for overcontrol of the one-way device to provide for advantageous use of the torque of a converter turbine in reducing transmission output speed.

Another object of this invention is to provide a multi-turbine torque converter in which a first turbine is connected to an output during a drive period by a governor-controlled clutch and which includes controls providing manual control over the governor so that the friction device is engaged for limited speed drive.

These and other objects of this invention will be apparent from the following description, claims and drawings in which:

Figure 1:
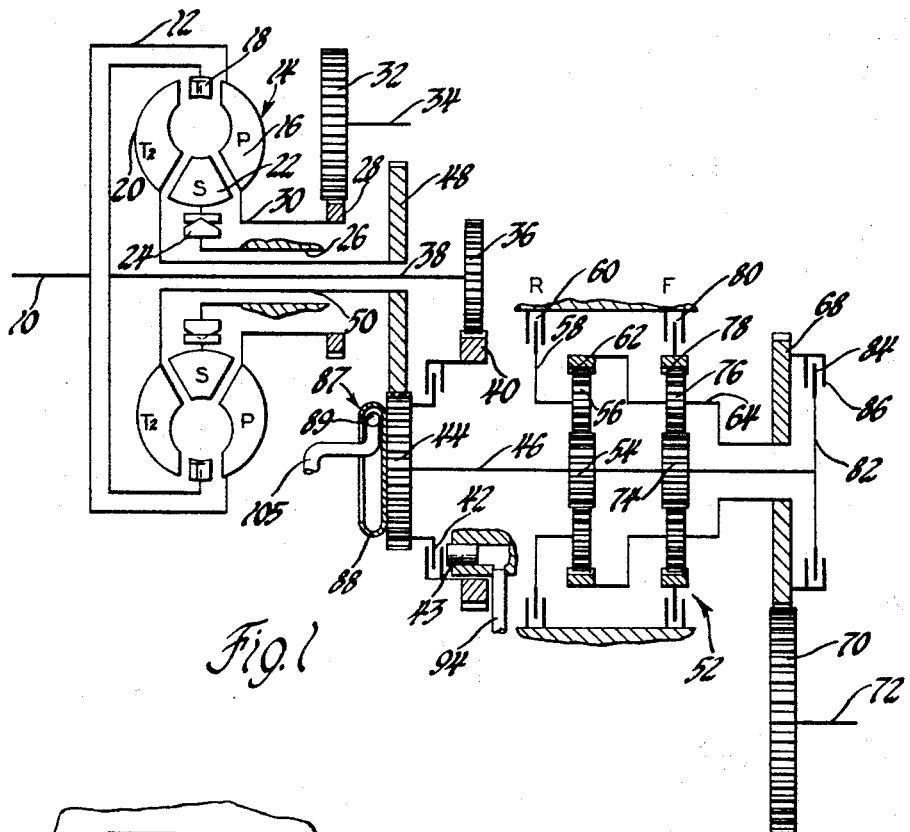
FIGURE 1 is a diagrammatic illustration of a torque converter transmission.

The transmission illustrated in FIGURE 1 has a power plant driven input shaft 10 which is connected to drive a rotary housing 12 of a hydrodynamic torque converter 14. The torque converter includes a pump 16 secured for rotation with the housing, a first turbine $T_1$ or 18, second turbine $T_2$ or 20, and a stator 22 which is connected by one-way brake 24 to a grounded sleeve shaft 26. A gear 28 is connected to the rotary housing 12 by a sleeve shaft 30 to drive the accessory or power takeoff drive gear 32 and connected drive shaft 34.

The turbine 18 is connected through a drive shaft 38 to drive a first turbine gear 36 which meshes with gear 40 and provides a high reduction ratio. A clutch 42 is selectively engageable by operation of a fluid pressure biased piston 43 to couple the first turbine with the gear 44 and the connected intermediate drive shaft 46. Suitable return springs, not illustrated, are used to move the piston to a retracted position upon release of this pressure.

The second turbine is connected to drive a gear 48 through a sleeve shaft 50. This latter mentioned gear meshes with the gear 44 which provides a lower gear ratio or an overdrive. With clutch 42 applied the torques of the first and second turbines are combined at gear 44.

The intermediate shaft provides the input to the two-speed forward and reverse transmission unit 52. As illustrated, the intermediate shaft drives the sun gear 54 of a reverse gear set which meshes with the planetary pinions 56 rotatably mounted on carrier 58. This carrier may be retarded from rotation by application of the reverse brake 60 so that the sun gear drives the ring gear 62 through the pinions. This ring gear then drives the carrier 64 of a forward drive planetary gear set. This latter mentioned carrier is connected to drive a transmission output gear 68 that meshes with a final output spur gear 70 to which vehicle drive output shaft 72 is securely coupled. The intermediate shaft also drives the low range sun gear 74 which meshes with the planetary pinions 76 mounted on the carrier 64. These pinions mesh with the ring gear 78 which may be held stationary by the low brake 80 to provide forward reduction drive of the output carrier 64 and the output gear 68. The intermediate shaft also drives the driving plate 82 of the high speed clutch 84 which has a driven plate 86 connected to the output gear.

A pitot governor 87 is provided to sense the speeds of the intermediate shaft 46 which speeds are proportional to converter output speeds. This governor includes a can 88, fixed to gear 44, to which fluid is fed and in which there is a rotating annulus of fluid when gear 44 is rotating. A pitot tube 89, fixed relative to the can, senses the magnitude of pressure head in the fluid and thereby functions as a speed-sensing device or hydraulic governor.

In this transmission converter ratio coverage is extended and high speed efficiency is provided by automatically releasing the first turbine for converter ratio upshift at intermediate output to input speed ratios, .5 ratio for example. The first turbine has a high torque at stall and a gradually decreasing torque to the mid-range speed ratio while the second turbine has a zero or small negative torque at stall and increasing torque to the mid-range speed ratio. Since these torques are combined by the gear 44, it is desirable to release clutch 42 so that the negative torque produced at the first turbine after the mid-range speed ratio will not detract from vehicle performance and so that the converter torque ratio will be extended. The automatic disengagement of clutch 42 for this upshift is obtained by the controls illustrated in FIGURE 2.

These controls include a valve 90 which has a valve element or spool 96 biased in one direction by a spring 98 and in an opposite direction by pitot governor pressure in chamber 100. As shown, line 105 connects the pitot tube with the chamber 100.

When the pitot governor pressure in chamber 100 produces a force which is greater than that of spring 98, the spring will be overcome and the valve element 96 will be shifted to the right so that clutch apply line 94 and the piston chamber will be exhausted through exhaust 104 to release clutch 42. With clutch 42 being released at mid-range speed ratio, converter performance and efficiency will be improved in the higher speed ratios. When the pressure in chamber 100 is reduced to a predetermined value, the valve element will be moved to the left in FIGURE 2 to close the exhaust 104 and again open line 94 and the piston chamber to pressure in main line 92; when line 94 is pressurized clutch 42 is applied. With clutch 42 engaged in the speed ratios lower than the mid-range speed ratio, first and second turbine torques are combined to produce high torque ratios for improved performance.

The control means further include a control valve 106 possessing a movable valve element 108 biased by spring 110 into engagement with a control orifice 112. A solenoid 114 is energizable to retract the element 108 from orifice 112 to open the control chamber 100 to exhaust 116 upon completion of an electric control circuit 118. This circuit includes a source of electric energy illustrated as battery 120 having a lead to a normally closed microswitch 122, a lead from switch 122 to the solenoid 144, and a lead from the solenoid back to the source 120 through a manually operable switch 124.

Figure 2:
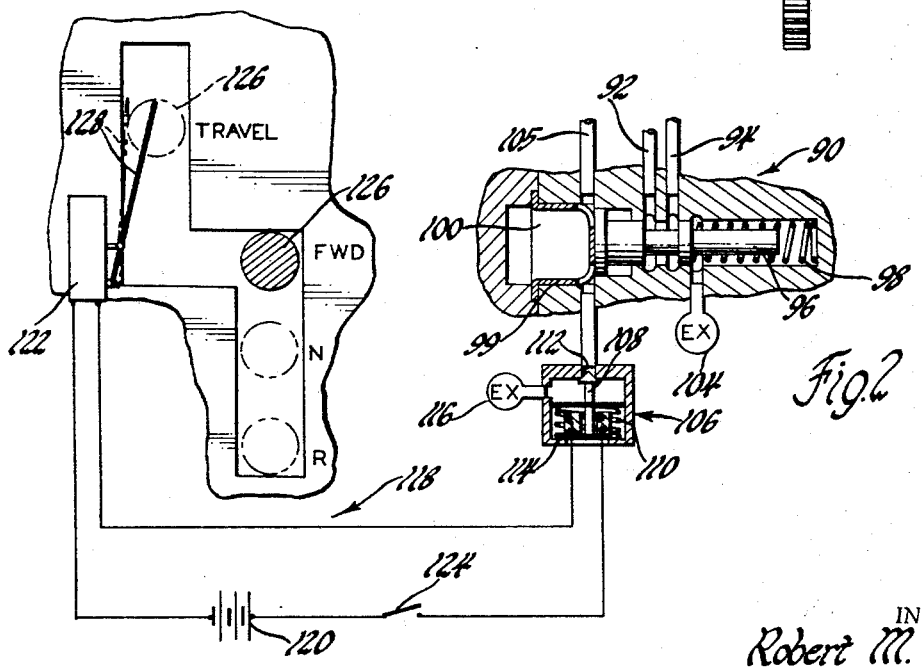
FIGURE 2 is a diagrammatic illustration of controls for the torque converter transmission of FIGURE 1.

Upon completion of the circuitry with switches 122 and 124 closed, the solenoid is energized and the valve element 108 is retracted and the control chamber 100 is open to exhaust 116. Valve element 96 will move to the FIGURE 2 illustrated position so that the clutch 42 is engaged by main line pressure and is not effected by speed signal from the pitot governor. However, when the transmission control lever 126 is moved in the gate into the TRAVEL position illustrated by the upper dotted circle, the switch lever 128 will be tripped to open switch 122 to break the circuit, thereby de-energizing the solenoid. Spring 110 is then operative to re-establish chamber 100 so that the clutch 42 is again governor controlled.

When lever 126 is in the forward, neutral or reverse position, switch 124 can be opened by the vehicle operator to break the circuit. This action causes chamber 100 to close and clutch 42 will be under governor control.

The transmission of this invention is particularly suitable for working vehicles, such as shovel loaders, fork lift trucks, bulldozers, etc. When these vehicles are working by pushing a load or raising a bucket, it is often desirable to prevent converter upshift by maintaining the engagement of the converter upshift clutch, which corresponds to the clutch 42 of FIGURE 1 or clutch 242 of FIGURE 5, so that the transmission output torque for driving the vehicle will be reduced and vehicle speed-up upon release of the load will be minimized. This minimization of vehicle speed-up is illustrated by FIGURES 3 and 4.

Figure 3:
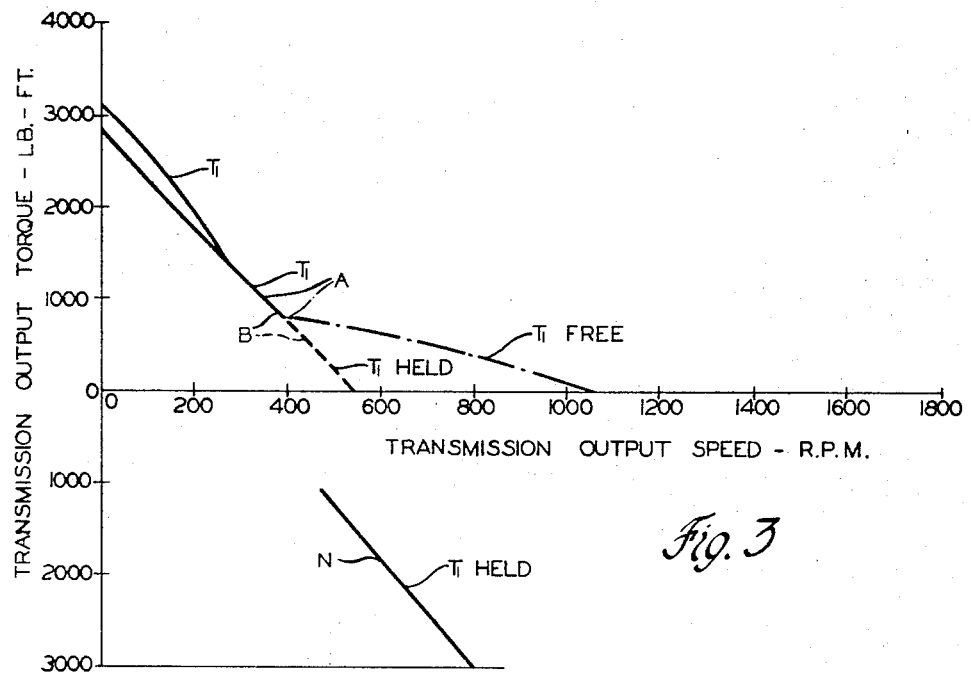
FIGURES 3 and 4 are graphs illustrating operation of the torque converter transmissions of FIGURE 1 and FIGURE 5.

FIGURE 3 shows the drive torque curves for the illustrated transmissions with Curve A representing the drive torque with clutch 42 of the first embodiment or corresponding clutch 242 of the second embodiment released at mid-speed ratio and Curve B representing the drive torque with clutch 42 of the first embodiment or correverter operation. With clutch 42 or 242 so held, it will be seen that the transmission output speed is substantially reduced as compared to the transmission output speed with the clutch and connected turbine free after the mid-speed ratio.

Figure 4:
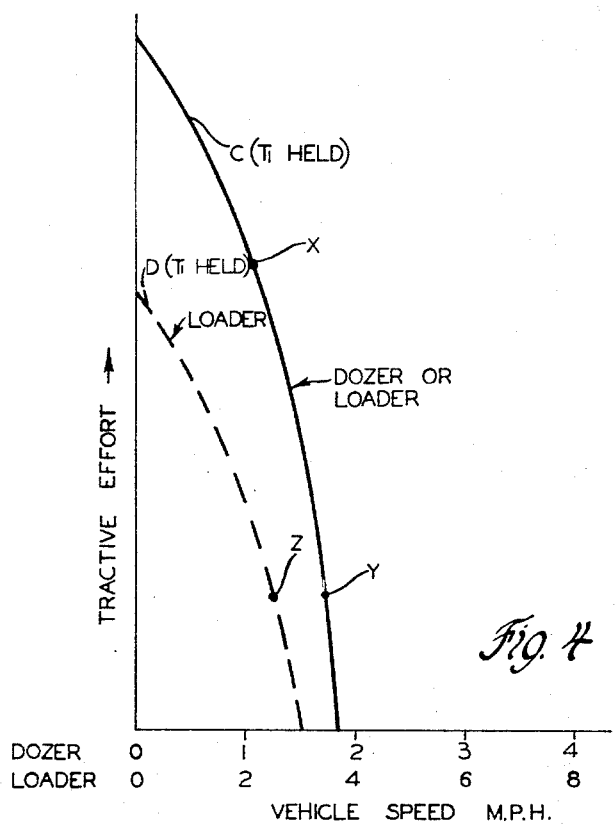

As shown in FIGURE 4, torque Curve C is a curve for a working vehicle, such as a bulldozer, in which the clutch 42 or 242 is held throughout the converter operation to minimize output speed. Assuming that the bulldozer is pushing a load and is operating at point X and the load is released, tractive effort requirements are lower, at point Y for example, and the vehicle will speed up. However, as shown, this vehicle speed-up is quite small and easily handled by the vehicle operator.

Assuming that the vehicle is a loader in which the power takeoff is used and drive torque Curve C represents the available drive torque with full engine power with the converter shift clutch applied and Curve D represents the available drive torque with the power takeoff being employed, the release of the power takeoff load provides full engine power to the drive wheels. Thus, if the vehicle is working with a tractive effort at point Z on Curve D and the power takeoff requirements are reduced, there will be increased power to the drive wheels which is represented by point Y on Curve C. When this additional power is available for vehicle drive the vehicle will speed up. However, as shown, with the first turbine held, the increase in vehicle speed will be minimized and the operator still will be able to efficiently operate the working loader.

To insure the engagement of clutch 42 during these operations and to insure that automatic upshift does not occur, circuit 118 is completed. When completed the valve element 96 is biased into engagement with the stop 99 as shown in FIGURE 2 and the main pressure line is coupled to the clutch apply line. This condition continues until governor pressure chamber 100 is re-established and pressure in chamber 100 overcomes the spring 98.

In operation the operator can select forward drive by moving the selector 126 to the FWD position. This causes engagement of the forward drive clutch 80 through control valves or other suitable means not illustrated. Reverse is obtained by moving the lever through neutral to the reverse position R to cause engagement of reverse clutch 60 and release of forward clutch 80.

In these drives, since the circuit is closed and governor pressure control chamber 100 is exahusted, there will be no converter upshift at mid-speed ratios. With the lower transmission output these ranges are quite effective for working cycles of a vehicle. Also, when descending downgrades with the output driving the converter with the first turbine clutch applied, a negative first turbine torque occurs. This is shown as Curve N on FIGURE 3. This negative torque is effective to retard the descent of the vehicle on downgrades.

It will be appreciated that the switch 124 can be opened by the operator to again re-establish governor control over the first turbine clutch 42 if desired.

When the lever is moved to the TRAVEL position, the clutch 84 is engaged for high range drive and switch 122 is opened. The converter can shift at the mid-range speed ratios for extended ratio coverage and high speed efficiency. During this time switch 124 is closed.

Figure 5:
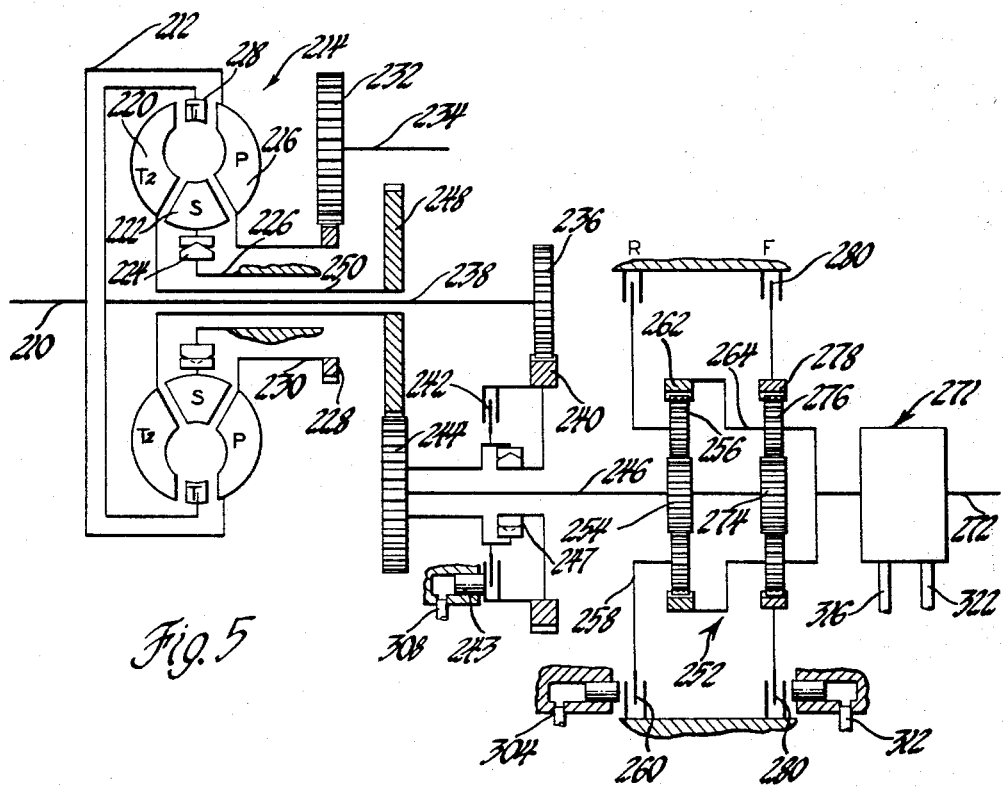
FIGURE 5 is a diagrammatic illustration of another torque converter transmission.

Turning now to another embodiment of the invention, there is shown in FIGURE 5 a twin turbine torque converter transmission which is similar to that of FIGURE 1 but has important differences in the structure and controls for engaging and disengaging the drive clutch between the first turbine and the intermediate drive shaft. This embodiment further has a one-way brake between these elements for automatic shifting and has a final two-speed unit instead of the high range drive of FIGURE 1.

FIGURE 5 illustrates a power plant driven input shaft 210 for driving rotary housing 212 of a dual range torque converter 214. This torque converter has a pump 216 secured to the housing, first turbine 218, second turbine 220, and a stator 222 connected to ground by one-way clutch 224 and a ground sleeve shaft 226. A power takeoff gear 228 is connected to the rotary housing by shaft 230 to drive the power takeoff gear 232 and connected drive shaft 234. The first turbine is connected through a drive shaft 238 to drive a first turbine gear 236 which meshes with a gear 240 to provide a high reduction ratio. A clutch 242 is selectively engageable by operation of a fluid pressure biased piston 243 to couple the first turbine and the ratio driven thereby with the drive gear 244 and the connected intermediate drive shaft 246. The first turbine is further coupled to this drive gear through a one-way clutch 247 which is connected in parallel with the clutch 242. At mid-speed ratio clutch 247 overruns to disconnect the first turbine from the drive.

The second turbine is connected to drive a second turbine gear 248 through a sleeve shaft 250 which gear meshes with the spur gear 244 to provide a high range drive. The torques of the first and second turbines may be combined at this latter mentioned gear.

The intermediate shaft provides the input to the forward and reverse speed transmission unit 252 as illustrated. The intermediate shaft drives the sun gear 254 of a reverse gear set which meshes with the planetary pinions 256 rotatably mounted on the carrier 258. This carrier may be retarded for rotation by application of the reverse brake 260 to provide for a reverse drive with ring gear 262 output. The ring gear is coupled to drive through a carrier 264 of a forward drive planetary gear set. This carrier provides the input to a two-speed range gear set 271 having a low and high range drive. Transmission output is through output shaft 272 leading from this range gear set.

The intermediate shaft also drives the low range sun gear 274 which meshes with the planetary pinions 276 mounted on carrier 264. These pinions mesh with the ring gear 278 which may be held stationary by the forward drive brake 280 to provide for forward drive of the output carrier 264.

Figure 6:
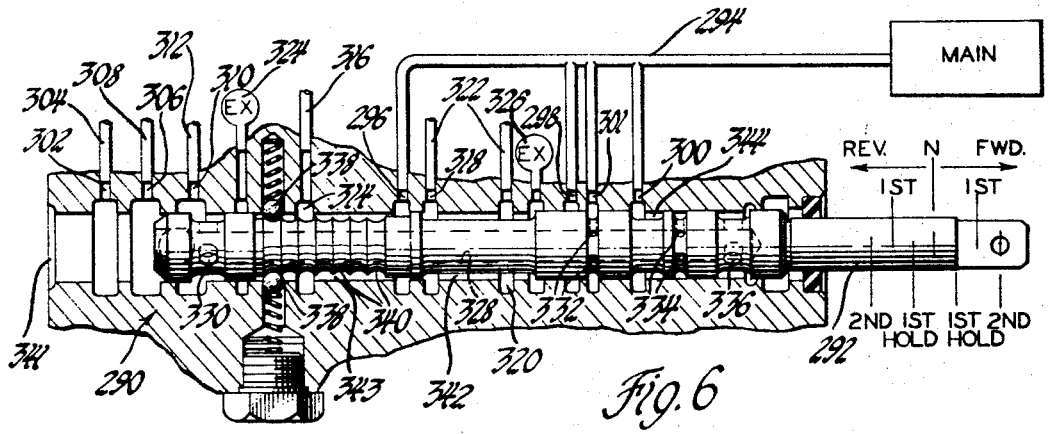
FIGURE 6 is a diagrammatic illustration of controls for a torque converter transmission of FIGURE 5.

The controls for this embodiment are illustrated in FIGURE 6 and include a selector valve 290 having a movable spool or valve element 292 having lands formed thereon, as shown, for controlling supply of fluid to and exhausting fluid from the clutches and brakes and establishing the various drive ranges mentioned above. This also includes the control over the first turbine clutch 242 to provide the benefits of first turbine negative torque in reducing vehicle output speed when working as described in connection with FIGURES 3 and 4 and the previous embodiment.

As shown, there is a main line 294 which is hydraulically coupled into the valve body at ports 296, 298, 300, and 301. The valve body also has port 302 connected to hydraulic line 304 leading to the reverse gear brake 260, port 306 connected to hydraulic line 308 leading to the first turbine hold clutch 242 for operating piston 243, port 310 connected to line 312 leading to the forward drive brake 280, port 314 connected to hydraulic line 316 leading to the high range drive clutch of the range gear set and ports 318 and 320 connected to hydraulic line 322 leading to the low clutch of this latter mentioned gear set.

Exhausts 324 and 326 are provided to control various clutches and brakes by exhausting operating fluid therefrom in response to predetermined valve element move-

| Direction | Valve position | Condition of engagement devices | | | | |
|---|---|---|---|---|---|---|
| | | Reverse (304) | Forward (304) | High (316) | Low (322) | Hold (308) |
| Fwd | 2nd (high) | E 304–341 | P 294–301–332–328–330–312 | P 294–296–343–316–312 | P 322–318–342–326 | E 308–341 |
| Fwd | 1st (low) | E 304–341 | P 294–293–332–328–330–312 | E 316–343–324 | P 294–296–342–318–322 | E 308–341 |
| Fwd | 1st hold (low hold) | E 304–341 | P 294–300–334–328–330–312 | E 316–343–324 | P 294–296–342–318–322 | P 294–300–334–328–330–308 |
| Neutral | Neutral | E 304–341 | E 312–310–343–324 | E 316–314–343–324 | P 294–296–342–318–322 | E 308–330–328–332–326 |
| Reverse | 1st hold (low hold) | P 294–300–336–328–330–304 | E 312–310–343–324 | E 316–314–343–324 | P 294–296–342–318–322 | P 294–300–336–328–330–308 |
| Reverse | 1st (low) | P 294–300–336–328–330–302–304 | E 312–343–324 | E 316–343–324 | P 294–296–342–318–322 | E 308–343–324 |
| Reverse | 2nd (high) | P 294–301–336–328–330–302–304 | E 308–306–343–324 | P 294–296–342–314–316 | E 322–344–326 | E 308–343–324 | ment as pointed out below. Also a free exhaust 341 formed by the open end of the shift valve body is provided to exhaust reverse brake 260 in neutral and the hold clutch 308 in first and second forward.

The valve element has an elongated axial bore 328 formed therein and connected outwardly-extending orifices 330, 332, 334 and 336. Lateral flow passages 342, 343 and 344 are provided between the bore in the housing for the valve element and the reduced diameter grooves on the valve element which passages are bounded at each end by the associated lands as shown. A spring biased ball detent 338 is seated in the valve housing and cooperates with a plurality of serially-arranged annular grooves 340 formed on the periphery of the valve element to hold it at any adjusted position.

Examination of valve 290 constructed according to the above description and specifically illustrated by FIGURE 6 will show that the engagement devices of FIGURE 5 are conditioned to operate through Pressurization (P) or released through Exhaust (E) according to the instant position of the detented shift valve 392. The chart above shows the pattern of P and E of the engagement devices for the 7 positions of the shift valve. The numbers listed above the designations P or E represent the path of the connections.

With this transmission and controls important benefits are obtained since the one-way clutch 247 will effect automatic release of the first turbine from the drive for converter shift when extended ratio coverage and high transmission efficiency is desired. However, when working and it is desired to lower the maximum transmission output speeds and reduce vehicle speed-up, the hold clutch may be engaged by manually shifting the valve element 292 to either the forward or reverse drive first hold position. When engaged, clutch 242 overrides the action of the one-way clutch to enable the operator to effectively utilize the negative first turbine torque and more effectively control his vehicle.

It will be understood that the invention can be modified beyond the illustrated embodiments, and therefore, any limitations to be imposed are those set forth in the following claims.

We claim:
1. In a torque converter transmission, a transmission input and an output, a hydrodynamic torque converter having a pump operatively connected to said input and at least two turbines, a torque transmitting member operatively connected to said output, separate power transmitting means drivingly connecting each of said turbines to said torque transmitting member, one of said power transmitting means including an engageable and disengageable clutch to connect and disconnect one of said turbines and said torque transmitting member, and control means for disengaging said clutch at a predetermined input/output speed ratio to increase the speed of said output and for maintaining said clutch at said predetermined speed ratio to reduce the speed of said output.

2. The transmission of claim 1 wherein said member is capable of driving said one of said turbines when coupled thereto by said clutch.

3. The transmission of claim 1 said control means being operative to produce a signal proportional to first turbine speed to effect engagement of said clutch.

4. The transmission of claim 1 in which a second of said turbines is connected to said member by speed reducing gearing and in which control valve means responding to predetermined speed signals from said member causes said clutch to disengage said first turbine and said member and responding to other predetermined speed signals from said member causes said clutch to couple said first turbine and said member.

5. In a transmission, a drive member and a driven member, a hydrodynamic unit having a pump operatively connected to said drive member and a plurality of rotor elements, means for operatively coupling said rotor elements to said driven member, said means including friction means for selectively coupling a first of said rotor elements to said driven member for a first condition of unit operation in which said first rotor element provides a high torque at stall and a gradually decreasing torque to a predetermined unit speed ratio, said friction means being further operative to disconnect said first rotor element and said driven member subsequent to the attainment of said predetermined speed ratio to allow another of said rotor elements to drive said driven member, said friction means being selectively engageable to maintain connection of said first rotor element subsequent to the attainment of said predetermined speed ratio to limit the maximum speed of said driven member.

6. The transmission defined in claim 5 wherein said friction means is automatically operated to disconnect said first rotor element and said driven member subsequent to the attainment of said predetermined speed ratio.

7. The transmission defined in claim 5 wherein said friction means includes a one-way device and a friction clutch connected in parallel between said first rotor element and said driven member.

8. The transmission defined in claim 5 wherein said friction means inclues a single friction clutch mechanism responsive to predetermined driven member speeds to accordingly couple and uncouple said first rotor element and said driven member, and means for causing engagement of said friction means regardless of driven member speed.

9. In a transmission, an input member and an output member, a hydrodynamic unit having a pump driven by said input member and a plurality of rotor elements, power transmitting means for operatively connecting said rotor elements to said output member, friction means operative in one condition of unit operation to connect a first of said rotor elements and said power transmission means and operative in another condition of unit operation to disconnect said first rotor element and said power transmission means so that all torque is supplied by the other of said rotor elements, said friction means also being selectively engageable to connect said first rotor element to said power transmitting means throughout unit operation to reduce the maximum speed of said output member.

10. The transmission defined in claim 9 wherein said friction means includes first and second friction means includes first and second friction units, said first friction uni being an overcontrol clutch to couple said first rotor element and said power transmitting means when said second friction unit has uncoupled said first rotor element and said power transmitting means.

11. The transmission defined in claim 9 wherein said first rotor element is effective to provide an automatic ratio shift when said friction means is operative to disconnect said first rotor element from said power transmission means subsequent to the attainment of a predetermined hydrodynamic uint speed ratio.

12. The transmission defined in claim 9 wherein said friction means is provided by a single friction clutch unit, override control means for causing engagement of said clutch unit throughout hydrodynamic unit operation.

13. The transmission defined in claim 9 and including control means for effecting engagement and disengagement of said friction means, said control means including a speed responsive unit operative in one condition of transmission operation to effect disengagement of said friction means and in another condition to effect engagement of said friction means, and override means to prevent said speed responsive unit from disengaging said friction means.

14. The transmission of claim 9 in which said friction means includes a one-way friction device, said friction device uncoupling said first rotor and said power transmitting means subsequent to a predetermined speed obtained by said first rotor element, means for overriding said one-way friction device to couple said last mentioned rotor element to said power transmitting means regardless of speed of said first rotor element.

15. The transmission of claim 13 wherein said speed responsive unit includes a pitot governor.

16. The transmission of claim 14 wherein said last mentioned means includes a selectively engageable friction clutch connected between said first turbine and said power transmitting means and in parallel with said one-way friction device.

17. The transmission of claim 16 and further including valve means for controlling supply of operating fluid to and exhausting operating fluid from said selectively engageable friction clutch.

18. The transmission of claim 17 and further including a forward and reverse ratio unit having an output, and a multispeed range unit driven by said last mentioend output, said valve means further providing a control for the ratios of said units.

19. In a transmission, an input and an output, a torque converter having a plurality of rotors for driving said output, one of said rotors having a high torque at stall which progressively decreases as transmission output speed increases, another of said rotors having minimum torque at stall which increases as transmission output speeds increase, means operative in one condition of torque converter operation for uncoupling one of said rotors at an output to input speed ratio to increase torque converter ratio coverage and transmission outptu speeds, said means being selectively operative to maintain the coupling of said last mentioned rotor and said transmission output throughout the torque converter operating range to decrease the torque converter ratio coverage and transmission output speed.

20. The transmission defined in claim 19 in which said means includes a friction clutch, speed responsive governor means operative to effect disengagement of said clutch as said transmission reaches a predetermined speed ratio and means for rendering said governor means ineffective to disengage said clutch thereby maintaining said clutch in engagement throughout converter operation.

21. The transmission defined in claim 19 and including a one-way friction device between one of said rotors and said output and selectively engageable clutch means to provide an overcontrol of said one-way device.

22. The transmission defined in claim 21 and including forward and reverse drive ratios, fluid actuated friction devices for establishing said ratios, a control valve having a movable element for selecting said drive ratios, said element being movable to maintain engagement of said clutch means annd establish forward and reverse ratios and being movable to other positions to release said cluth means and establish forward and reverse ratios.

23. The transmission defined in claim 19, said means being an engageable and disengageable friction clutch, fluid operated motor means for operating said clutch, valve means for controlling the supply of operating fluid to and from said motor means, a governor providing a biasing signal to said valve means proportional to transmission output speed tending to move said valve means to a position to effect clutch disengagement, and means for rendering said governor signal ineffective to disengage said clutch thereby allowing said clutch to be engaged regardless of transmission output speed.

24. The transmission of claim 23 in which said last mentioned means includes an electromagnetic device, said device when energized rendering said governor signal ineffective.

25. The transmission of claim 23 and further including a control circuit for said electromagnetic means including a source of electric energy and a plurality of switches, a control valve operated by said electromagnetic means, means for biasing said control valve to establish a control chamber for said governor, said electromagnetic means being effective when energized to move said control valve against said biasing means to exhaust said chamber, a transmission control member for selecting transmission ratios, said member when moved to one position to operate one of said switches and break said circuit, said last mtntioned switch automatically closing when said transmission control is moved therefrom, said second mentioned switch being operative to break said circuit at any transmission control setting.

References Cited
UNITED STATES PATENTS

| | | | |
|---|---|---|---|
| 942,406 | 12/1909 | Norton | 74—661 |
| 2,860,713 | 11/1958 | Peterson | 74—661 |
| 3,127,790 | 4/1964 | Howey | 76—661 |
| 3,214,998 | 11/1965 | Hall | 74—661 |
| 3,256,751 | 6/1966 | Tuck et al. | 74—718 |

CARLTON R. CROYLE, *Primary Examiner.*

ALLAN D. HERRMANN, *Assistant Examiner.*

U.S. Cl. X.R.

60—54; 192—3.33, 85, 103; 285—311; 339—75

UNITED STATES PATENT OFFICE
CERTIFICATE OF CORRECTION

Patent No. 3,433,096                              March 18, 1969

Robert M. Tuck et al.

It is certified that error appears in the above identified patent and that said Letters Patent are hereby corrected as shown below:

Column 4, lines 24 and 25, "of the first embodiment or correverter operation." should read -- or 242 held throughout the converter operation. --. Columns 5 and 6, in the table, sub-heading to the fourth column, line 2 thereof, "(304)" should read -- (312) --; same table, sixth column, line 1 thereof, "P" should read -- E --; same table, fourth column, line 6 thereof, "294-293-" should read -- 294-298- --; same table, seventh column, line 5 thereof, "E" should read -- P --. Column 7, line 24, "above" should read -- below --. Column 8, line 26, "inclues" should read -- includes --; line 50, "uni" should read -- unit --. Column 9, line 20, "mentioend" should read -- mentioned --; line 32, "outptu" should read -- output --. Column 10, line 5, "cluth" should read -- clutch --; line 32, "mtntioned" should read -- mentioned --.

Signed and sealed this 7th day of April 1970.

(SEAL)
Attest:

EDWARD M. FLETCHER, JR.                      WILLIAM E. SCHUYLER, JR.
Attesting Officer                                  Commissioner of Patents